W. E. WHITE.
MEANS FOR SPACING REINFORCING BARS.
APPLICATION FILED DEC. 3, 1919.
Reissued Mar. 23, 1920. 14,825.
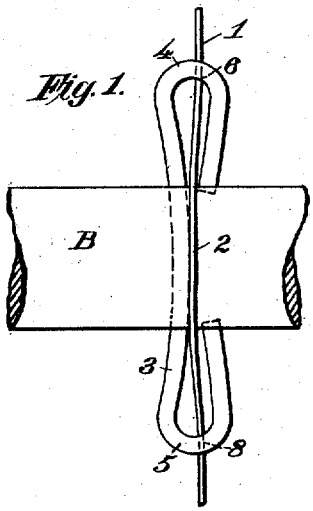
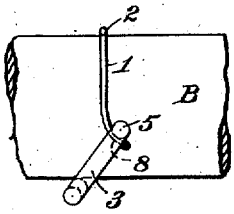
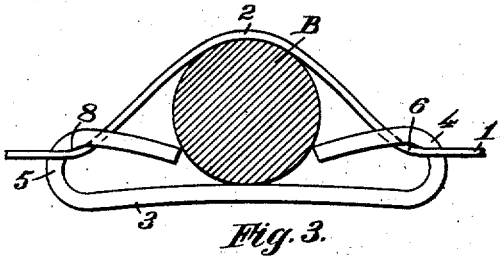
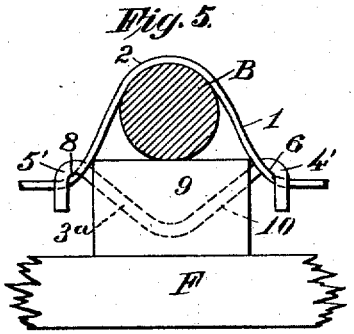
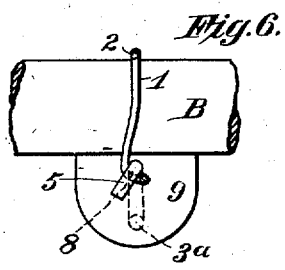
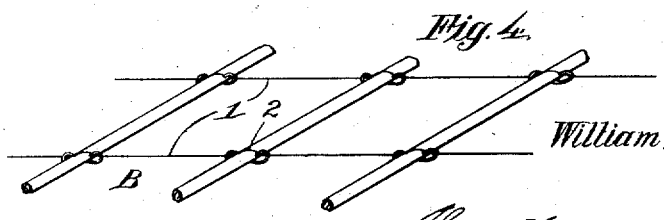
Inventor
William E. White
By Chas. F. Thomas
Attorney

UNITED STATES PATENT OFFICE.

WILLIAM E. WHITE, OF MINNEAPOLIS, MINNESOTA.

MEANS FOR SPACING REINFORCING-BARS.

14,825. Specification of Reissued Letters Patent. Reissued Mar. 23, 1920.

Original No. 1,306,984, dated June 17, 1919, Serial No. 255,223, filed September 23, 1918. Application for reissue filed December 3, 1919. Serial No. 342,237.

*To all whom it may concern:*

Be it known that I, WILLIAM E. WHITE, a citizen of the United States of America, residing at Minneapolis, in the county of Hennepin and State of Minnesota, have invented certain new and useful Improvements in Means for Spacing Reinforcing-Bars, of which the following is a specification.

My invention is in the art of concrete reinforcement. It has particular reference to a means for spacing reinforcing bars.

In this art of concrete reinforcement it is the common practice to space the reinforcing bars by means of other bars laid transversely upon the reinforcing bars and tied thereto by wiring the intersections. When these transverse bars are to serve the purpose of temperature bars as well as that of a spacing means during pouring their use is of course highly advisable. But, in many instances where bars are used, the temperature function is of no moment, all that is really desired being the spacing prior to and during pouring. In these cases, the excess metal whose use is compelled by the use of bars as spacers, and the excess labor involved in tying the bars, is a dead loss. Only that amount of material and labor ought to be used which is necessary to perform properly the function of spacing the reinforcing bars prior to and during pouring. It is to the practical solution of this problem that I have set myself and to which my invention relates.

The object of this invention, then, is to furnish a practical means of lowest possible material and labor cost for the simple spacing of reinforcing bars.

In the accompanying drawings,—

Figure 1 is a plan view of the device of my invention, holding a reinforcing bar;

Fig. 2 is an end elevation of the device, holding the bar;

Fig. 3 is a side elevation of the device, holding the bar;

Fig. 4 is a perspective view of a series of bars spaced according to my invention;

Fig. 5 is a side elevation of a modified device embodying my invention, holding a bar; and Fig. 6 is an end elevation of the device illustrated in Fig. 5, holding the bar.

Referring now to the drawings and for the present, more particularly to Figs. 1, 2, 3, and 4—

A reinforcing bar is represented at B, it being of course understood that, in practice, and as illustrated in Fig. 4, there will be a series of these bars to be held in spaced relation during the pouring of the concrete about them. To space these bars I provide the length of wire 1 extending from bar to bar and receiving the bars. Now this wire is bendable by hand to form a pocket 2 at each bar and is of such physical characteristics that it retains, under normal conditions, the form into which the workman bends it, being preferably, ordinary cheap annealed wire without material temper, as distinguished from being elastic and highly tempered. Thus, I use one of the least expensive forms of wire. Again, this wire, being of relatively small cross-section contains far less metal, and so is far less expensive, than the spacing bars of common use. For combination with the wire, I provide for each pocket, a substantially rigid clip 3 with looped ends 4 and 5, say, of stiff wire, and shown in Figs. 1, 2, 3, and 4 as having its intermediate portion of similar wire integral with the ends. The function of the clip is to close the related pocket on its open side. But, since the wire 1 used retains its pocketed shape by virtue of its own characteristics these clips are not used to put the wire under stress and so bind or spring the wire about the bars. They are not for that purpose. Their purpose is to close the open sides of the pockets and link the wire at one side of the bend to that at the other side to present a closed pocket. The wire does not require to be stressed to keep it in its pocketed form and each pocket is a complete self-sustaining entity depending not at all on stress in the wire between the pockets.

The clip and its connection with the wire are of such character that should the wire or bar be subjected to abnormal conditions and forces tending to straighten out the pocket, when the bar is in place in the pocket, the clip will prevent the straightening out of the pocket.

The assembly is wholly by hand manipulation, no tools being required, and may be accomplished as follows (Fig. 3): The workman first makes a locating kink 6 in the wire at the point where the first-applied loop, as 4, is to be received; he then applies the loop 4 to the wire at the bend 6; the bar to be pocketed is then brought into position, the clip passing beneath the bar so that the wire 1 can be bent and conform to the bar, and brought into engagement with the loop 5. On being brought into engagement with the loop 5 the wire 1 is then bent at the point 8 of engagement so that its lengthwise direction lies toward the position at which the next bar is to be pocketed. This completes the operation for the particular bar in question, there being no elastic springing of the wire out of shape or snapping of the clip thereon, such time-consuming and tool-requiring skilled labor being wholly uncalled for.

When applied to the forms for the concrete, the wire, with the bars located therealong and held in place, is fastened to the form, say at the ends of the wire, the wire being merely easily located without particular strain or tautening thereof and with no purpose of straining of the wire to tauten it about the bars—the permanent pockets eliminate the necessity or desirability of any action of that character.

It will be seen that the construction set forth greatly reduces the expense of spacing the bars, both as to the cost of materials and as to the cost of labor. Another advantage is that, since the attaching of the wire to the bars does not depend upon putting the wire under longitudinal stress or side spring, the bars can be assembled with the wire without the necessity of having the wire attached to rigid supports at its ends. That is, it is not necessary to attach the ends of the wire to rigid supports, strain the wire taut, and then apply the bars and clips by forcibly springing the wire out of shape and then snapping on the clips to forcibly retain the wire in its new and unnatural position.

It will be noted that, as shown, the pocket, as 2, is in the character of a flared arch and adjacent its crown corresponds in shape to the uninterrupted surface of the bar. Also, the intermediate portion of the clip, located for contact with the bar, contacts on substantially a tangent line (Fig. 3). Again, as previously brought out, the wire and clip are not strained and sprung about the bar to grasp it with excessive force. Therefore, after the wire and bars are assembled, it is easily convenient to slide the bars longitudinally of themselves through the pockets or rotate them, and also, because of the non-strained character of the connections, to relocate the pockets in the wire. Thus fine adjustments of the bars can be made quickly and with a minimum of labor.

In Figs. 5 and 6 the modified form of clip illustrated embodies the same basic principles of invention and advantage as the major form, but has this distinction:— The intermediate portion, between the looped ends 4′ and 5′ of stiff wire, of the clip 3′ includes (conveniently cast upon a shank 10 of similar wire integral with the ends) a spacer or chair 9 of the same material, essentially, as the article being cast, say concrete, to space the bar from the form F.

The chair may be constructed of other material and the fastening means, which constitute the equivalent of the clip heretofore described, may be in the form of hooks having the same function so far as their connection with the spacing wire is concerned as those formed on the ends of the wire clip 3.

In the use of the chair of material other than concrete provision will be made for the minimum exposure of such material to the exterior surface of the finished concrete thus avoiding discoloration due to the corrosion at such exposed points.

While I have shown the improvement as applied to a reinforcing bar which is circular in cross-section it will be understood that it may be applied with equal facility to bars of other cross-section. When used with such bars it may be necessary or desirable to modify somewhat the shape of the clip 3, or of the bearing surface of the chair in the event chairs are employed.

What I claim is—

1. In the art of concrete reinforcement, a device for combination with a reinforcing bar to hold the same located during pouring, said device comprising a length of wire and a clip combined for pocketing and retaining the bar in position on the wire, the clip presenting two looped ends and an intermediate portion therebetween, the wire of said length having physical characteristics permitting its easy bending into an open pocket to receive the bar and locate it on the wire and its self-retention of such pocket, and the looped ends of the clip being adapted to receive the length of wire therein with an end adjacent a respective side of said pocket in the wire and said intermediate portion bridging and closing the opening of the pocket whereby said pocket and clip form, in themselves, a closed bar receptacle; substantially as described.

2. In the art of concrete reinforcement, the combination of a reinforcing bar with a device for holding the bar located, said device comprising a length of wire and a relatively stiff clip for pocketing and retaining the bar, the clip presenting two looped ends and an intermediate portion therebetween, the wire of said length having physical characteristics permitting its easy bending into an open pocket to receive the bar and its self-retention of such pocket, the wire being so bent and so receiving said bar and forming an arch with its portion adjacent its crown in position to contact with the bar at one side of the bar, the looped ends of the clip receiving the length of wire therein with an end adjacent a respective foot of the arch and the intermediate portion of the clip spanning and closing the opening of the pocket and linking the arch-sides together and being in position for contact with the bar at the side thereof substantially opposite that with which the crown of the arch is positioned to contact; substantially as described.

3. In the art of concrete reinforcement, the combination of a reinforcing bar with a device for holding the bar located during pouring, said device comprising a length of wire and a relatively stiff clip for pocketing and retaining the bar, the clip presenting two looped ends and an intermediate portion therebetween, the wire of said length having physical characteristics permitting its easy bending into an open pocket to receive the bar and its self-retention of such pocket, the wire being so bent and so receiving said bar and forming a flared arch with its portion adjacent its crown in position to contact with the bar at one side of the bar, the looped ends of the clip receiving the length of wire therein with an end adjacent a respective foot of the arch and the intermediate portion of the clip spanning and closing the opening of the pocket and linking the arch-sides together and being in position for contact with the bar at the side thereof substantially opposite that with which the crown of the arch is positioned to contact; substantially as described.

4. In the art of concrete reinforcement, a device for combination with a reinforcing bar to hold the same located during pouring, said device comprising a length of wire and a clip for pocketing and retaining the bar, the clip presenting two looped ends and an intermediate portion therebetween, the wire of said length having physical characteristics permitting its easy bending into an open pocket and its self-retention of such pocket, and the looped ends of the clip being adapted to receive the length of wire therein with an end adjacent a respective side of said pocket and said intermediate portion spanning and closing the opening of the pocket, said intermediate portion including a spacing chair of concrete-like material; substantially as described.

5. In the art of concrete reinforcement, for combination with a bar to be received in the concrete, a chair to space the bar from the form, said chair comprising a block of concrete-like material having a surface adapted to engage the form and being provided with attaching means fastened to the block to provide a unitary structure, whereby said block and means form a self-complete member, said means being spaced from said surface by the block proper, and so from the form, thereby to be completely concealed in the poured concrete, and said means being for use in attaching the chair to the bar; substantially as described.

6. Spacing means for reinforcing bars comprising in combination, a length of wire adapted to extend in a line at right angles to the spaced bars, said wire being bent to form an offset portion at each bar whereby the lengths of wire between adjacent bars constitute a line extending transversely of the bars and located at one side thereof, and a fastening clip adapted to engage the wire at the bend on each side of the bar, said clip lying at one side of the bar substantially in line with said lengths of wire; substantially as described.

7. Spacing means for reinforcing bars comprising in combination, a length of wire adapted to extend in a line at right angles to the spaced bars, said wire being bent to form an offset portion at each bar whereby the lengths of wire between adjacent bars constitute a line extending transversely of the bars and located at one side thereof, and a fastening clip adapted to engage the wire at the bend on each side of the bar, said clip lying at one side of the bar substantially in line with said lengths of wire and consisting of a relatively straight length of stiff wire having hooks at its ends; substantially as described.

8. Means for spacing concrete bars comprising in combination, a chair for spacing the bar away from a form, and a length of wire extending at substantially right angles to the bars to be spaced, said wire being bent to form an open pocket at each bar, and means in the form of hooks on said chair for engaging the wire at the bend on each side, said hooks being located substantially in line with the surface of the chair where it engages said bar; substantially as described.

9. In spacing means for reinforcing bars, the combination with a bar, of a chair on which the bar is adapted to rest to suitably space the same from a form, a length of wire extending at right angles to the said bar, said wire being bent at the bar to provide an open pocket, the lengths of wire at each side of the bar extending in a line substantially coincident with the lower surface of the bar at the point where it rests on said chair, and means in the form of hooks carried by the chair and located one at each side of said bar for engaging the wire at the bends therein; substantially as described.

Signed at St. Paul, this 26th day of November, 1919.

WILLIAM E. WHITE.

Witness:
H. L. Dow.